(12) United States Patent
Feddersen

(10) Patent No.: US 7,068,015 B1
(45) Date of Patent: Jun. 27, 2006

(54) WIND POWER PLANT HAVING MAGNETIC FIELD ADJUSTMENT ACCORDING TO ROTATION SPEED

(75) Inventor: Lorenz Feddersen, Flensburg (DE)

(73) Assignee: Vestas Wind Systems A/S, Ringkobing (DK)

( * ) Notice: Subject to any disclaimer, the term of this patent is extended or adjusted under 35 U.S.C. 154(b) by 0 days.

(21) Appl. No.: 10/089,291

(22) PCT Filed: Oct. 5, 2000

(86) PCT No.: PCT/DK00/00558

§ 371 (c)(1),
(2), (4) Date: Mar. 27, 2002

(87) PCT Pub. No.: WO01/25628

PCT Pub. Date: Apr. 12, 2001

(30) Foreign Application Priority Data

Oct. 7, 1999  (DK) ................................ 1999 01436

(51) Int. Cl.
  *H02P 9/00* (2006.01)
  *H02P 9/04* (2006.01)
  *F03D 7/02* (2006.01)
  *F03D 7/04* (2006.01)
  *F03D 9/02* (2006.01)

(52) U.S. Cl. ..................... 322/89; 322/44; 290/44
(58) Field of Classification Search ............. 322/89, 322/44; 290/44
  See application file for complete search history.

(56) References Cited

U.S. PATENT DOCUMENTS

| 3,317,873 | A | * | 5/1967 | Himmelstein et al. ...... 336/120 |
|---|---|---|---|---|
| 3,348,181 | A | * | 10/1967 | Stromswold ................. 336/120 |
| RE26,501 | E | * | 12/1968 | Himmelstein et al. ....... 336/120 |
| 3,525,026 | A | * | 8/1970 | Ahamed ...................... 324/163 |
| 3,531,749 | A | * | 9/1970 | Himmelstein et al. ....... 336/120 |
| 3,611,230 | A | * | 10/1971 | Maake ......................... 336/120 |
| 3,740,565 | A | * | 6/1973 | Wesley ......................... 290/55 |
| 3,882,436 | A | * | 5/1975 | Chass ........................... 336/83 |
| 4,059,771 | A | * | 11/1977 | Jacobs et al. ................. 290/44 |
| 4,189,648 | A | * | 2/1980 | Harner ......................... 290/44 |
| 4,316,096 | A | * | 2/1982 | Syverson ...................... 290/44 |
| 4,316,699 | A | * | 2/1982 | Schott et al. ............... 416/139 |
| 4,345,230 | A | * | 8/1982 | Chass ......................... 336/135 |
| 4,357,542 | A | * | 11/1982 | Kirschbaum ................. 290/44 |
| 4,361,794 | A | * | 11/1982 | Kawada et al. ............ 318/800 |
| 4,395,669 | A | * | 7/1983 | Berna et al. ................ 318/502 |

(Continued)

FOREIGN PATENT DOCUMENTS

EP    0150884    8/1985

(Continued)

*Primary Examiner*—Darren Schuberg
*Assistant Examiner*—Pedro J. Cuevas
(74) *Attorney, Agent, or Firm*—Donald S. Dowden; Cooper & Dunham LLP

(57) ABSTRACT

A wind power plant where the driving shaft communicates with a synchronous generator (3) optionally through a gear (2) and with a transformer, if any, communicating through an AC/DC inverter 7 with an HVDC transmission cable 9. The synchronous generator (3) is connected to a magnetic field controller (3). In response to an output parameter, such as the power generated by the synchronous generator (3), this magnetic field controller (4) is adapted to vary the magnetic field in the generator (3) in response to said output parameter. As a result it is possible to compensate for a possible variation in the output parameter, whereby said output parameter is stabilized. As a result it is possible to compensate for a varying speed of rotation.

10 Claims, 5 Drawing Sheets

U.S. PATENT DOCUMENTS

| | | | | |
|---|---|---|---|---|
| 4,395,699 | A * | 7/1983 | Sternberg | 382/257 |
| 4,409,050 | A * | 10/1983 | Carter et al. | 156/172 |
| 4,412,198 | A * | 10/1983 | Reich | 336/120 |
| 4,418,287 | A * | 11/1983 | Syverson | 290/44 |
| 4,511,807 | A * | 4/1985 | Somerville | 290/44 |
| 4,656,413 | A * | 4/1987 | Bourbeau | 322/47 |
| 4,672,287 | A * | 6/1987 | Fujioka et al. | 318/806 |
| 4,677,360 | A * | 6/1987 | Garces | 318/803 |
| 4,695,736 | A * | 9/1987 | Doman et al. | 290/44 |
| 4,720,640 | A * | 1/1988 | Anderson et al. | 290/43 |
| 4,906,060 | A | 3/1990 | Claude | 322/29 |
| 4,926,105 | A * | 5/1990 | Mischenko et al. | 318/800 |
| 4,992,920 | A * | 2/1991 | Davis | 363/36 |
| 5,083,039 | A * | 1/1992 | Richardson et al. | 290/44 |
| 5,155,375 | A * | 10/1992 | Holley | 290/44 |
| 5,191,309 | A * | 3/1993 | Laros | 336/120 |
| 5,225,712 | A * | 7/1993 | Erdman | 290/44 |
| 5,289,041 | A * | 2/1994 | Holley | 290/44 |
| 5,347,256 | A * | 9/1994 | Yumiki et al. | 336/84 C |
| 5,652,485 | A | 7/1997 | Spiegel et al. | 318/147 |
| 5,701,114 | A * | 12/1997 | Chass | 336/115 |
| 5,705,872 | A * | 1/1998 | Loge | 310/161 |
| 5,798,632 | A | 8/1998 | Muljadi | 322/29 |
| 6,038,761 | A * | 3/2000 | Meiler et al. | 29/605 |
| 6,118,201 | A * | 9/2000 | Dulin et al. | 310/161 |
| 6,420,795 | B1 * | 7/2002 | Mikhail et al. | 290/44 |
| 6,891,460 | B1 * | 5/2005 | Tezuka et al. | 336/130 |
| 6,906,447 | B1 * | 6/2005 | Leijon et al. | 310/196 |
| 6,909,262 | B1 * | 6/2005 | Yao et al. | 322/28 |
| 2003/0102949 | A1 * | 6/2003 | Matsuura et al. | 336/198 |

FOREIGN PATENT DOCUMENTS

| | | |
|---|---|---|
| WO | WO 9007823 | 7/1990 |
| WO | WO 9214298 | 8/1992 |
| WO | WO 9322819 | 11/1993 |
| WO | WO 9745908 | 12/1997 |
| WO | WO 9747878 | 12/1997 |
| WO | WO 9907996 | 2/1999 |

* cited by examiner

WIND POWER PLANT HAVING MAGNETIC FIELD ADJUSTMENT ACCORDING TO ROTATION SPEED

TECHNICAL FIELD

The invention relates to a wind power plant where the driving shaft communicates with a synchronous generator optionally through a gear, and where a transformer with n output windings communicates with an HVDC-transmission cable through an AC/DC-rectifier, measures being taken so as to secure against possible variations in the speed of rotation.

The use of a DC transmission cable implies that it is not necessary to take into account the capacitive load generated by the cable. In addition, it is possible to make the HVDC transmission cables longer than the AC transmission cables. These AC transmission cables must not exceed a so-called "critical length".

BACKGROUND ART

WO97/45908 discloses a wind power park where each wind turbine is equipped with a synchronous generator. The output power of the synchronous generator is rectified by means of an AC/DC rectifier and transmitted through a DC transmission cable to a DC/AC inverter and a transformer so as to be transferred to the regional supply network. The AC/DC rectifier comprises controlled rectifiers, which are able to compensate for possible variations in the speed of rotation through a suitable control by means of particular control circuits. However, such control circuits are rather complicated.

WO 92/14298 and WO 99/007996 disclose a variable speed wind turbine comprising active power converters for providing AC power. These power converters include active controlled rectifiers and require expensive controller circuits.

BRIEF DESCRIPTION OF THE INVENTION

The object of the invention is to provide a wind turbine plant where each wind turbine is able to tolerate sudden gusts and is of a more simple construction than hitherto known.

A wind turbine plant of the above type is according to the invention characterised by a magnetic field controller connected to the generator, said magnetic field controller being adapted to vary the magnetic field in the synchronous generator in response to a speed of rotation-depending output parameter of said synchronous generator in such a manner that possible variations in the speed of rotation are compensated for, whereby the AC/DC rectifier is composed of diodes. As a result, passive rectifier elements suffice in the rectifier. In addition, the controllable rectifiers and the associated control circuits are avoided which should otherwise be used for compensating for possible variations in the speed of rotation.

Moreover according to the invention the magnetic field controller may be adapted to detect the current generated by the synchronous generator, a negative feedback being established by means of the magnetic field controller for regulating the current through the rotor winding.

In addition, the magnetic field controller may according to the invention be adapted to detect the voltage generated by the synchronous generator, a negative feedback being established by means of said magnetic field controller.

Moreover, the magnetic field controller may according to the invention be adapted to detect the power generated by the synchronous generator, a negative feedback being established by means of said magnetic field controller.

Furthermore, the negative feedback may according to the invention include a P, I or D regulation, optionally a combination of said regulations.

Moreover, the rotor of the synchronous generator may according to the invention be dimensioned with a relatively low inductance. As a result, the time constant of the magnetic field controller can be reduced.

Moreover, the rotor may according to the invention be adapted to rotate at a relatively high speed of rotation. As a result it is possible to further reduce the inductance of said rotor.

When the generator furthermore is multipolar, it is possible to further reduce the inductance of the rotor.

BRIEF DESCRIPTION OF THE DRAWINGS

The invention is explained in greater detail below with reference to the accompanying drawings, in which.

BEST MODE FOR CARRYING OUT THE INVENTION

Figure 1:
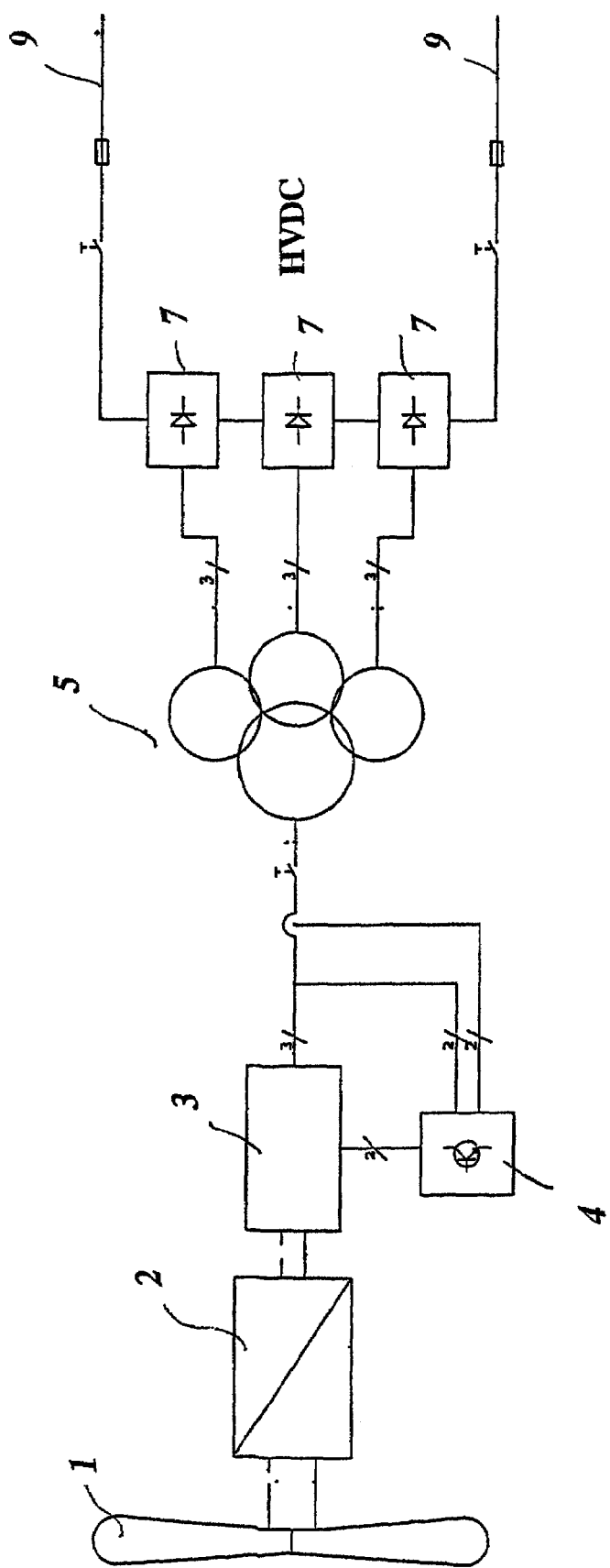
FIG. 1 shows a wind power plant according to the invention comprising a synchronous generator and an AC/DC rectifier.
Figure 3:
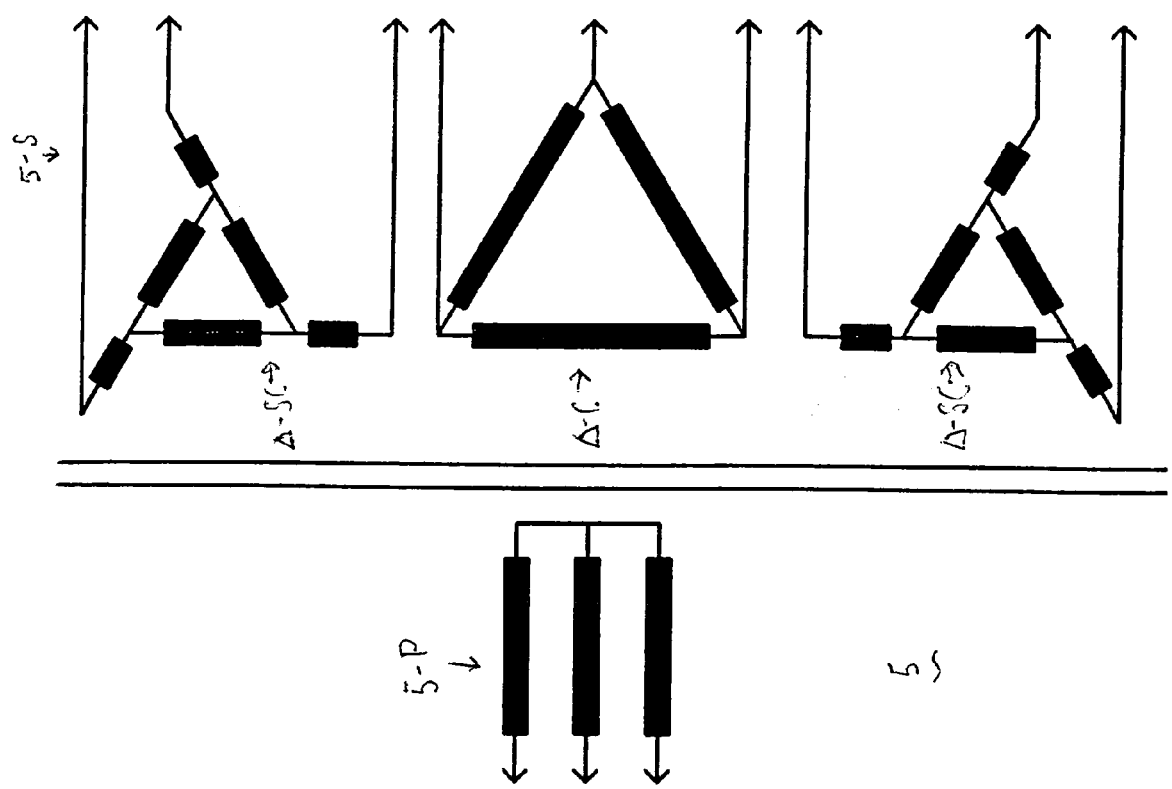
FIG. 3 shows a transformer connected to the synchronous generator.
Figure 4:
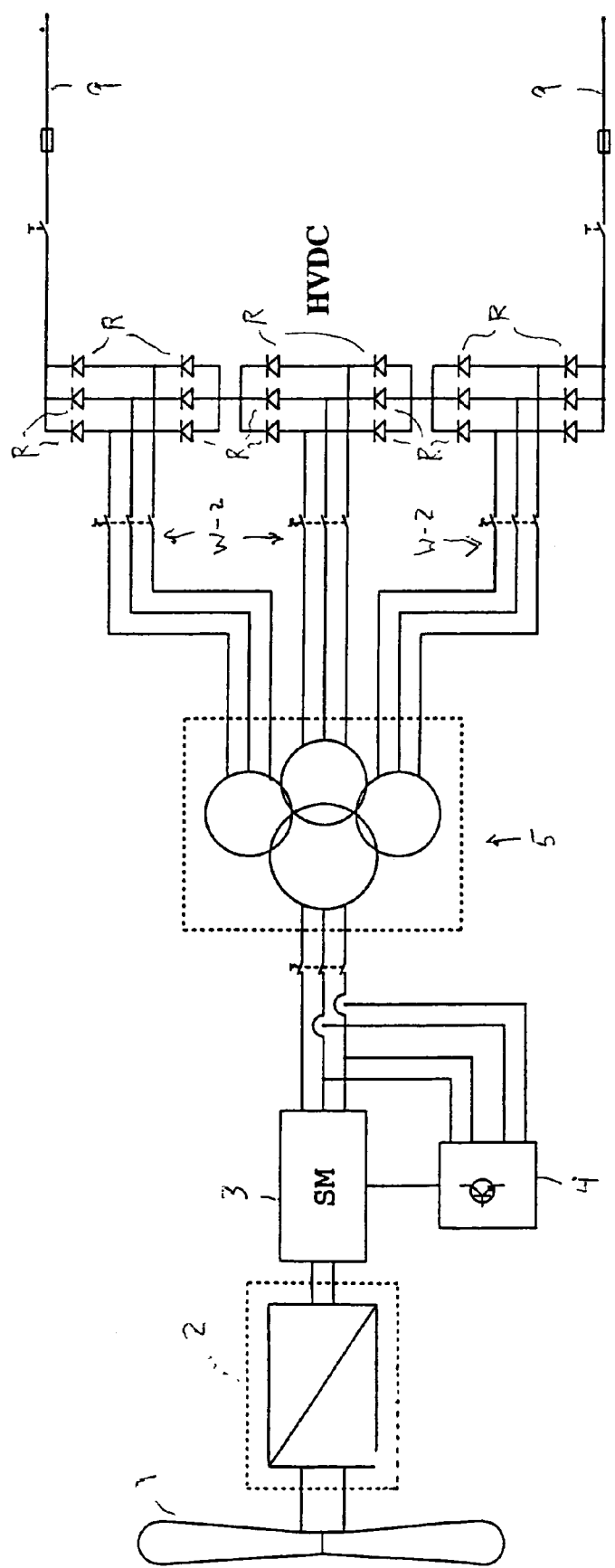
FIG. 4 illustrates the entire plant, where the AC/DC rectifier has been shown in greater detail.

The wind power plant shown in FIG. 1 comprises a number of arms 1 secured to hub communicating with a synchronous generator 3, optionally through a gear 2. The synchronous generator 3 is preferably a conventional three-phase synchronous generator with an energy supply to the rotor winding not involving a collector ring. The three-phase output of the synchronous generator 3 communicates with an AC/DC rectifier 7 through a possibly three-phase transformer 5. The AC/DC rectifier 7 delivers a DC voltage to a DC transmission cable 9. The most simple embodiment of the high-voltage rectifier 7 is formed by ordinary diodes coupled in series and accordingly is a passive rectifier. The series coupling of the diodes is established by means of several output windings on the output of the transformer 5. In this manner the voltage is reduced to al the diodes and the harmonic flows in the generator/transformer are reduced. The three-phase transformer 5 can be designed as indicated in FIG. 3, where the primary side 5-P is connected to the generator output and comprises a star connection, and the secondary side 5-S is connected to the AC/DC rectifier 7 and can be composed of a Δ-connection Δ-C and two combined Δ-star connections Δ-SC. The voltages generated by the secondary side of the transformer 5 are transferred to an AC/DC rectifier in form of a so-called B6 diode bridge, cf. FIG. 4. This B6 diode bridge comprises a total of eighteen rectifier elements R, vix. six on each secondary winding W-2, where each of the three phase conductors of each secondary winding W-2 is connected to the connection point of the two rectifier elements R coupled in the same direction, said three pairs of rectifier elements being coupled in parallel. The parallel coupling of the rectifier elements R associated with each of the three secondary windings W-2 is subsequently coupled in series with the result that an HVDC-voltage is transmitted from the combined coupling of rectifier elements to an HVDC transmission cable 9. This transmission cable 9 can be several km long, such as 10 km. The use of such a DC transmission cable 9 instead of an AC cable is advantageous in the length being arbitrary and almost unlimited. Thus it is not a question of a critical length as in connection with an AC cable. The end of the DC transmission cable 9 can be connected to a conventional DC/AC inverter converting into a mains frequency and be connected to the regional supply network optionally through a three-phase transformer. Measures have, of course, been taken to ensure that the alternating voltage generated by the DC/AC inverter 7 is in phase with the regional supply network.

Figure 5:
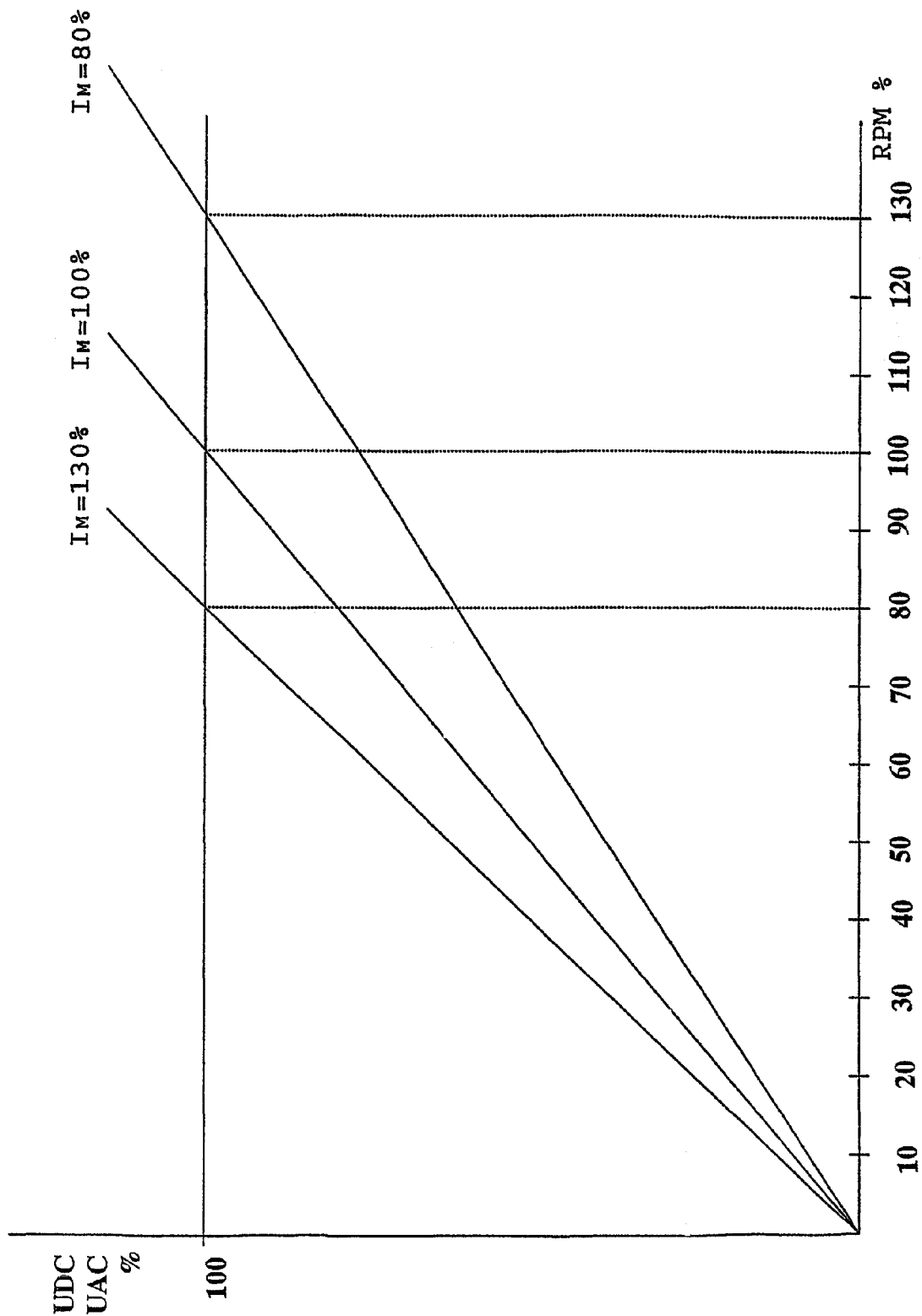
FIG. 5 shows the voltage versus the speed of rotation at various magnetizing currents to the synchronous generator.

A demand exists, of course, for a possibility of running the wind power plant at a speed of rotation depending on the wind speed. However, an increase of the speed of rotation implies that a high voltage is generated because the voltage is proportional to the speed of rotation, cf. the curves of FIG. 5. However, the output voltage is also proportional to the magnetic field in the generator 3, which can be utilized for stabilizing the voltage in case the speed of rotation is changed. The latter has according to the invention been obtained by means of a magnetic field controller 4 detecting an output parameter of the generator 3, such as the current and the voltage or the product thereof. This magnetic field controller 4 regulates the current supply to the rotor windings in the generator in response to the output parameter. As a result, a negative feedback is established with the result that when the output power is increased the current supply to the rotor winding 3a is reduced, whereby the system automatically seeks equilibrium. When the speed of rotation for instance is increased to 130% relative to an ordinary speed of rotation, the magnetizing current to the rotor winding 3a is reduced to 80%, cf. FIG. 5. When, on the contrary, the speed of rotation decreases to 80% relative to the ordinary speed of rotation, the magnetizing current to the rotor winding 3a is increased to 130%.

Figure 2:
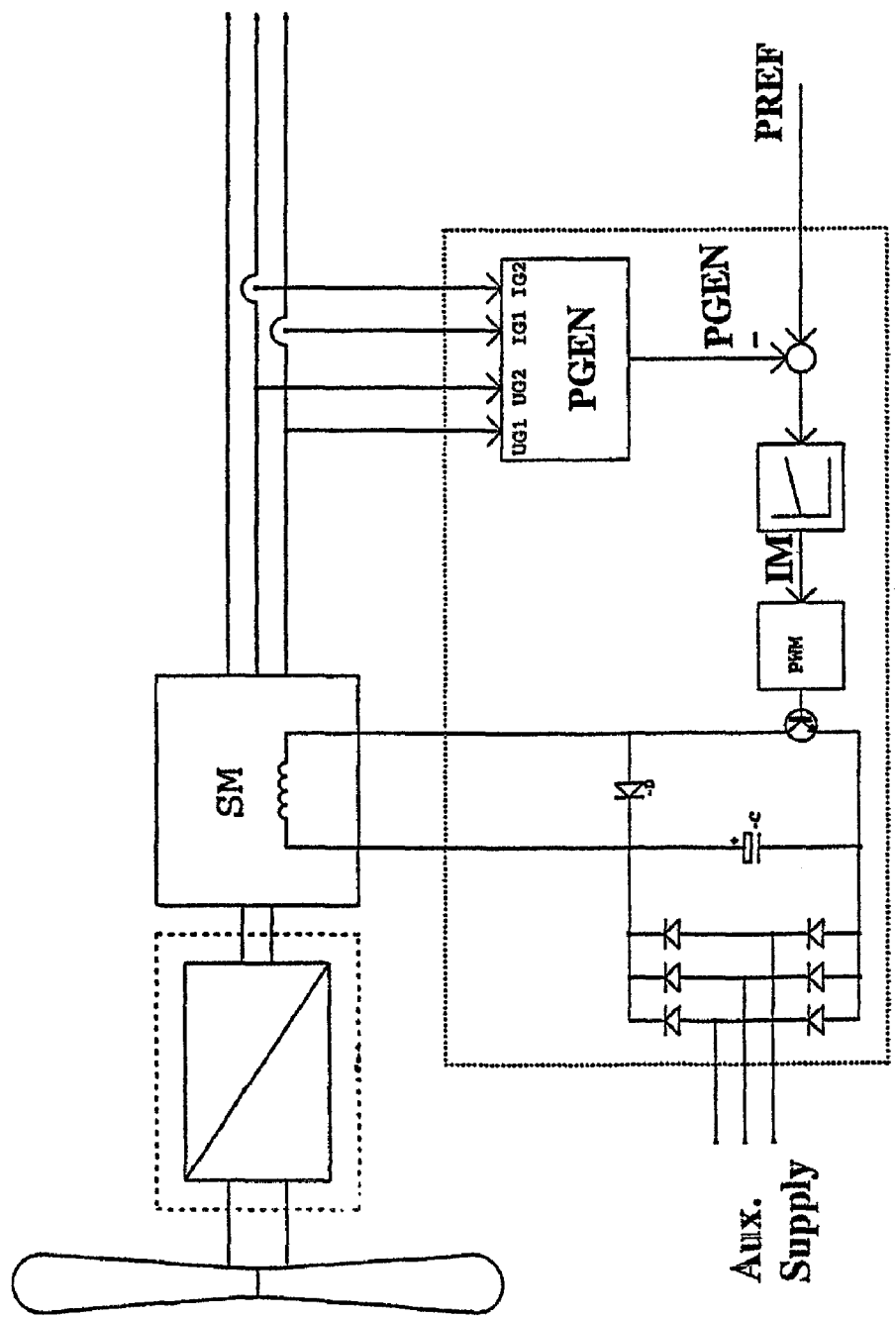
FIG. 2 illustrates a magnetic field controller for the synchronous generator of FIG. 1.

FIG. 2 shows an embodiment in greater detail of the magnetic field controller 4, and it appears that in two of the three phases of the generator the currents IG1, IG2 and the voltages UG1, UG2, respectively, are detected. These parameter values are multiplied in pairs to obtain an expression of the output power $P_{gen}$. This output power $P_{gen}$ is compared with a reference value $P_{ref}$ and the difference therebetween, viz. the error signal, is transferred to a regulation unit 11. In response to this error signal, the regulation unit generates a value for the magnetizing current $I_m$ which is to be transferred to the rotor winding, optionally through a PWM 12 (Pulse Width Modulator) and an amplifying power transistor 13 controlling the supply of current to the rotor winding. The negative feedback is established by the detected power $P_{gen}$ being deducted from the reference power $P_{ref}$. As a result a detected increased power $P_{gen}$ implies that the error signal is reduced and that the power supplied to the rotor windings is reduced as well.

The power for the magnetizing of the generator 3 is typically of the magnitude 1% of the nominal power of the generator.

A portion of the magnetizing can optionally be provided by means of permanent magnets, where an electric magnetizing is then used for controlling the speed of rotation. The speed of rotation is downwardly limited by a maximum magnetizing current due to the limited thermal properties of the rotor windings and the magnetic structure of the generator, viz. the magnetic saturation. In order to extend the lower limit of the speed of rotation it is therefore advantageous when either the generator is provided with an additional output presenting an increased nominal output voltage or the transformer is provided with an input presenting a reduced nominal voltage. These additional inputs are only to be dimensioned for low power as the wind energy is low at a low speed of rotation.

According to a particularly advantageous embodiment, the wind turbine comprises a transformer with n output windings coupled in series with rectifiers so as to obtain an HVDC. The output windings can be coupled as a star or a Δ or as a combination thereof in order to obtain a sinusoidal input current.

The invention claimed is:

1. A wind power plant where a driving shaft communicates with a synchronous generator (3) and with a transformer with a number of output windings, said transformer communicating through an AC/DC rectifier with an HVDC transmission cable (9), measures being taken so as to secure against possible variations in the speed of rotation, characterised by a magnetic field controller (4) connected to the generator (3), said magnetic field controller (4) being adapted to vary the magnetic field in the synchronous generator (3) in response to a speed of rotation-depending output parameter of said generator (3) in such a manner that possible variations in the speed of rotation are compensated for, wherein the AC/DC rectifier is composed of diodes.

2. A wind power plant as claimed in claim 1, characterised in that the magnetic field controller (4) is adapted to detect the currents (IG1, IG2) generated by the synchronous generator (3), a negative feedback being established for regulating the current through the rotor winding (3a).

3. A wind power plant as claimed in claim 1, characterised in that the magnetic field controller (4) is adapted to detect the voltages (IG1, IG2) generated by the synchronous generator (3), a negative feedback being established for regulating the current through the rotor winding (3a).

4. A wind power plant as claimed in claim 1, characterised in that the magnetic field controller (4) is adapted to detect the power generated by the generator (3), a negative feedback being established for regulating the current through the rotor winding (3a) in response to the detected power.

5. A wind power plant as claimed in claim 4, characterised in that the negative feedback for regulating the current through the rotor windings (3a) includes a P, I or D regulation or a combination thereof.

6. A wind power plant as claimed in claim 1, characterised in that the rotor windings are dimensioned with a relatively low inductance.

7. A wind power plant as claimed in claim 1, characterised in that the rotor is adapted to rotate at a speed of rotation high enough to further reduce the inductance.

8. A wind power plant as claimed in claim 1, characterised in that the synchronous generator (3) is multipolar.

9. A wind power plant as claimed in claim 1, where the wind turbine comprises a transformer with a number of output windings coupled in series with n an equal number of rectifiers so as to obtain an HVDC.

10. A wind power plant as claimed in claim 1 wherein the driving shaft communicates with the synchronous generator (3) through a gear (2).

* * * * *